(No Model.)
J. B. DUNLOP.
TIRE FOR WHEELS OF VELOCIPEDES.
No. 473,831. Patented Apr. 26, 1892.
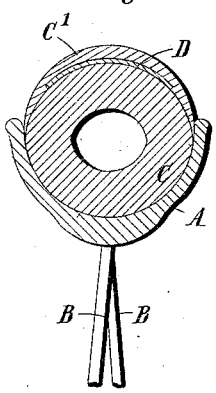
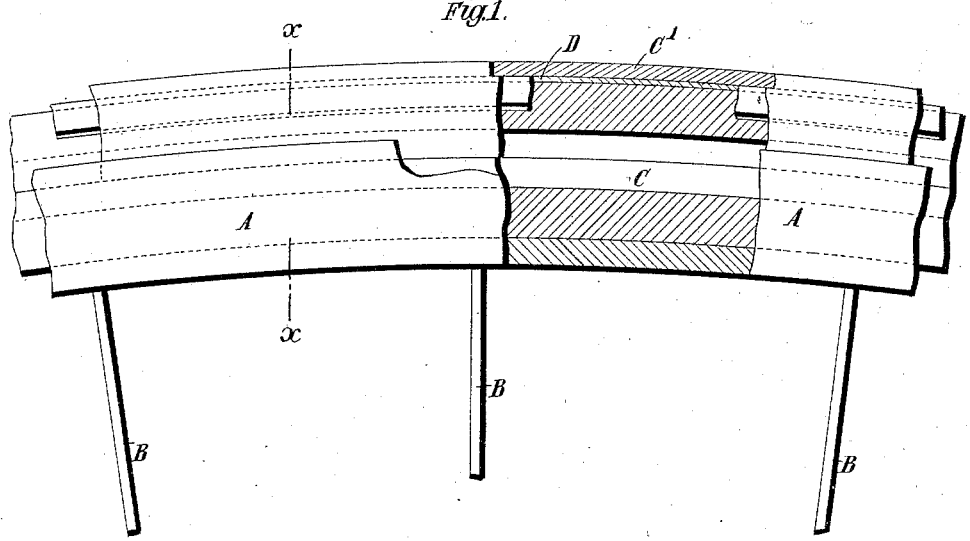
Witnesses:
J. A. Rutherford.
Geo. W. Rea.
Inventor:
John Boyd Dunlop
By James L. Norris.
Attorney

UNITED STATES PATENT OFFICE.

JOHN BOYD DUNLOP, OF BELFAST, ASSIGNOR TO THE PNEUMATIC TYRE AND BOOTH'S CYCLE AGENCY, LIMITED, OF DUBLIN, IRELAND.

TIRE FOR WHEELS OF VELOCIPEDES.

SPECIFICATION forming part of Letters Patent No. 473,831, dated April 26, 1892.

Application filed December 18, 1890. Serial No. 375,160. (No model.) Patented in England October 10, 1890, No. 16,080.

*To all whom it may concern:*

Be it known that I, JOHN BOYD DUNLOP, veterinary surgeon, a subject of the Queen of Great Britain, and a resident of Belfast, Antrim, Ireland, have invented certain new and useful Improvements in Tires for Wheels of Velocipedes and other Vehicles, (for which I have obtained Letters Patent in Great Britain, No. 16,080, bearing date October 10, 1890,) of which the following is a specification, reference being had to the accompanying drawings.

This invention is an improvement applicable to that class of tires for the wheels of velocipedes and other vehicles which are composed of india-rubber or elastic material and which are adapted to support partially or wholly the weight of the vehicle and its occupant.

The object of my present invention is to produce an elastic tire, whether solid or hollow and having the usual circular or rounded tread or bearing-surface, with more practicable provision than others heretofore made for obviating the objectionable spreading or expansion of the tread, or that portion of the tire that comes in contact with the ground or other surface when the said tire is in use, and to which spreading or expansion elastic tires of this kind or class as hitherto made are especially liable.

By reason of the improvement which I have devised and applied to such tires the tread or outer surface of the tire which comes in contact with the ground remains firmly, or comparatively so, in position under the action of a superimposed weight or while resisting tractional strains, thereby greatly reducing the friction between said tire and the ground or other surface and enabling the propulsion or traction of the vehicle to be more easily effected and greater speed to be obtained—as, for instance, in the case of velocipedes or the like—than is possible with tires of this kind or class as hitherto made.

To this end my invention consists of the novel construction and arrangements of parts hereinafter described and claimed, reference being made to the accompanying drawings, in which—

Figure 1 is a side elevation, partly in section, showing a portion of the rim of a velocipede or other wheel and an elastic tire with my improvement applied thereto. Fig. 2 is a transverse section on the line x x, Fig. 1.

Like letters indicate corresponding parts throughout the drawings.

A is the rim of the wheel, and B B are the spokes thereof.

C is an elastic tire, which may be hollow, as shown, and of a circular or oval cross-section, so as to present a rounded surface to the ground.

D is a continuous strip or band of linen, cloth, or other non-elastic material or material only slightly elastic or having comparatively little stretching or giving qualities. The said strip or band D is cemented or otherwise suitably secured in a cavity or recess provided therefor in the outer elastic protective covering C' of india-rubber or other suitable material. The strip D is a narrow band of sufficient width to cover only the outer peripheral or tread portion of the ring or band C and is stretched or drawn tightly within the recess in said outer elastic covering C', the sides of which outer elastic covering extend on either side of the strip or band D and are suitably secured to the inner elastic tire C. By this novel construction the objects of my invention are effectively secured.

It has been proposed to insert strips of canvas and other materials in the body of an elastic tire for various purposes, to build up a composite tire of rubber and canvas, and to reinforce the tread or bearing-surface in various ways, as by cementing or attaching around the same a strip of metal or leather and other materials; but such constructions are not claimed by me, as they are not of my invention.

Tires constructed in accordance with my invention have all the advantages of a solid rubber tire, with the additional advantage which the presence of the canvas band within the same imparts.

Although I have hereinbefore described my invention as applied more particularly to a hollow or tubular elastic india-rubber or other tire, it is obvious that my said invention is also advantageously applicable to cellular, grooved, solid, or to any suitable form of elastic tire.

My improved tire may be first built up and afterward placed in position upon the wheel of the velocipede or other vehicle or it may be built up while in position thereon.

What I claim is—

The herein-described elastic tire for the wheels of vehicles, which consists of an inner elastic part of india-rubber C, an outer elastic part C′, having a cavity or recess, and a continuous strip or band D, of linen, cloth, or other non-elastic material, fitted into and secured in the cavity or recess of the outer elastic part C′, the sides of said outer elastic part C′ extending on either side of the non-elastic part D and suitably secured to the inner elastic part C, as and for the purpose set forth.

In testimony whereof I have hereunto signed my name in the presence of two subscribing witnesses.

JOHN BOYD DUNLOP.

Witnesses:
 JNO. D. COOKE,
 R. O. RUBY.